(12) United States Patent
Ueki

(10) Patent No.: US 9,772,003 B2
(45) Date of Patent: Sep. 26, 2017

(54) VIBRATION DAMPING DEVICE

(71) Applicant: BRIDGESTONE CORPORATION, Tokyo (JP)

(72) Inventor: Akira Ueki, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 15/124,413

(22) PCT Filed: Dec. 26, 2014

(86) PCT No.: PCT/JP2014/084638
§ 371 (c)(1),
(2) Date: Sep. 8, 2016

(87) PCT Pub. No.: WO2015/141104
PCT Pub. Date: Sep. 24, 2015

(65) Prior Publication Data
US 2017/0016508 A1    Jan. 19, 2017

(30) Foreign Application Priority Data
Mar. 17, 2014  (JP) ................................ 2014-053570

(51) Int. Cl.
*F16F 13/10* (2006.01)
*F16F 13/00* (2006.01)
(Continued)

(52) U.S. Cl.
CPC ............ *F16F 13/107* (2013.01); *F16F 13/10* (2013.01); *F16F 9/05* (2013.01); *F16F 9/437* (2013.01);
(Continued)

(58) Field of Classification Search
CPC ...... F16F 9/05; F16F 9/437; F16F 9/50; F16F 13/002; F16F 13/105; F16F 13/107; F16F 2230/24
(Continued)

(56) References Cited

U.S. PATENT DOCUMENTS 3,323,550 A   6/1967 Lee, II
4,811,934 A   3/1989 Bebermeier et al.
(Continued)

FOREIGN PATENT DOCUMENTS

CN   102834643 A   12/2012
EP   0 068 395 A2   1/1983
(Continued)

OTHER PUBLICATIONS

Communication dated Apr. 27, 2017 from the State Intellectual Property Office of the P.R.C. in counterpart application No. 2014800771356.
(Continued)

*Primary Examiner* — Thomas Irvin
(74) *Attorney, Agent, or Firm* — Sughrue Mion, PLLC

(57) ABSTRACT

A laminar flow path (34) is opened into the vortex chambers (33a and 33b) from inner peripheral surfaces that face in radial directions of the vortex chambers (33a and 33b) being aimed in circumferential directions of the vortex chambers (33a and 33b) among wall surfaces defining the vortex chambers (33a and 33b). A communication hole (32b) is opened into the vortex chamber (33a and 33b) from an end surface that faces in a direction of center axis of the vortex chamber (33a and 33b) being aimed in a direction of a center axis among the wall surfaces defining the vortex chamber (33a and 33b). Blocking members (36a and 36b) extending in the direction of the center axis so as to surround the communication hole (32b) from an outside in the radial (Continued)

direction are provided within the vortex chambers (33*a* and 33*b*). The blocking members (36*a* and 36*b*) are provided with flow openings (37*a* and 37*b*) penetrating the blocking members (36*a* and 36*b*). The vortex chambers (33*a* and 33*b*) form circulating flows of a liquid according to a flow speed of the liquid flowing in from the laminar flow path (34) and allows the liquid to flow out from the communication hole (32*b*) through the flow openings (37*a* and 37*b*). Therefore, simplification of structure and facilitation of manufacture are achieved while maintaining product characteristics of a vibration damping device.

7 Claims, 4 Drawing Sheets

(51) Int. Cl.
*F16F 9/43* (2006.01)
*F16F 9/05* (2006.01)
(52) U.S. Cl.
CPC .......... *F16F 13/002* (2013.01); *F16F 13/105* (2013.01); *F16F 2230/24* (2013.01)
(58) Field of Classification Search
USPC ..................................................... 267/140.13
See application file for complete search history.

(56) References Cited

U.S. PATENT DOCUMENTS

| | | | | |
|---|---|---|---|---|
| 4,893,797 A * | 1/1990 | Le Fol | .................... | F16F 13/18 |
| | | | | 180/312 |
| 4,909,490 A | 3/1990 | de Fontenay | | |
| 6,158,724 A * | 12/2000 | Takashima | ............ | F16F 13/103 |
| | | | | 267/140.13 |
| 8,807,544 B2 * | 8/2014 | Yamamoto | ............ | F16F 13/106 |
| | | | | 267/140.13 |
| 9,074,654 B2 * | 7/2015 | Ueki | ..................... | F16F 13/107 |
| 2012/0139174 A1 * | 6/2012 | Matsumoto | ............. | F16F 13/10 |
| | | | | 267/140.13 |
| 2012/0292837 A1 * | 11/2012 | Hettler | .................. | F16F 13/105 |
| | | | | 267/140.11 |
| 2012/0313306 A1 | 12/2012 | Ueki et al. | | |
| 2016/0053844 A1 * | 2/2016 | Nagasawa | ............ | B60K 5/1208 |
| | | | | 267/140.13 |
| 2016/0053845 A1 * | 2/2016 | Ueki | ..................... | B60K 5/1208 |
| | | | | 267/140.13 |
| 2016/0053846 A1 * | 2/2016 | Nagasawa | ............ | B60K 5/1208 |
| | | | | 267/140.13 |
| 2016/0102728 A1 * | 4/2016 | Ueki | ..................... | F16F 13/107 |
| | | | | 267/140.13 |
| 2016/0131219 A1 * | 5/2016 | Ueki | ..................... | F16F 13/107 |
| | | | | 267/140.13 |
| 2016/0160956 A1 * | 6/2016 | Ueki | ..................... | F16F 13/107 |
| | | | | 267/140.13 |
| 2016/0245364 A1 * | 8/2016 | Ueki | ..................... | F16F 13/107 |
| 2016/0281814 A1 * | 9/2016 | Ueki | ..................... | F16F 13/107 |
| 2016/0298716 A1 * | 10/2016 | Ueki | ..................... | F16F 13/107 |
| 2017/0016508 A1 * | 1/2017 | Ueki | ..................... | F16F 13/107 |
| 2017/0023089 A1 * | 1/2017 | Ueki | ..................... | F16F 13/105 |
| 2017/0023090 A1 * | 1/2017 | Ueki | ..................... | F16F 13/10 |
| 2017/0023091 A1 * | 1/2017 | Ueki | ..................... | F16F 13/10 |
| 2017/0030428 A1 * | 2/2017 | Ueki | ..................... | B60K 5/1208 |
| 2017/0037924 A1 * | 2/2017 | Ueki | ..................... | F16F 13/10 |
| 2017/0045108 A1 * | 2/2017 | Ueki | ..................... | F16F 13/10 |
| 2017/0089421 A1 * | 3/2017 | Ueki | ..................... | F16F 13/10 |
| 2017/0167564 A1 * | 6/2017 | Ueki | ..................... | F16F 13/107 |

FOREIGN PATENT DOCUMENTS

| | | | |
|---|---|---|---|
| EP | 0 286 527 A1 | 10/1988 | |
| EP | 2 420 697 A1 | 2/2012 | |
| JP | 57-118921 A | 7/1982 | |
| JP | 60-073147 A | 4/1985 | |
| JP | 61-101137 U | 6/1986 | |
| JP | 62-28543 A | 2/1987 | |
| JP | 2007-120598 A | 5/2007 | |
| JP | WO 2015012145 A1 * | 1/2015 | ............ F16F 13/107 |

OTHER PUBLICATIONS

Communication dated Apr. 20, 2017 from the European Patent Office in counterpart application No. 14885938.2.

* cited by examiner

VIBRATION DAMPING DEVICE

CROSS REFERENCE TO RELATED APPLICATIONS

This application is a National Stage of International Application No. PCT/JP2014/084638 filed Dec. 26, 2014, claiming priority based on Japanese Patent Application No. 2014-053570 filed Mar. 17, 2014, the contents of all of which are incorporated herein by reference in their entirety.

TECHNICAL FIELD

The present invention relates to a vibration damping device that is applied to, for example, automobiles, industrial machines, or the like, and absorbs and damps vibrations of vibration generating parts, such as engines.

Priority is claimed on Japanese Patent Application No. 2014-053570, filed Mar. 17, 2014, the content of which is incorporated herein by reference.

BACKGROUND ART

As this type of vibration damping device, for example, the configuration described in the following Patent Document 1 is known. This vibration damping device includes a tubular first attachment member that is coupled to any one of a vibration generating part and a vibration receiving part, a second attachment member that is coupled to the other thereof, an elastic body that couples both the attachment members together, and a partitioning member that partitions a liquid chamber within the first attachment member having a liquid enclosed therein into a first liquid chamber and a second liquid chamber. This vibration damping device further includes a first limiting passage and a second limiting passage that allow both the liquid chambers to communicate with each other, a cylinder chamber provided between both the liquid chambers, and a plunger member disposed so as to be movable between an open position and a blocking position within the cylinder chamber.

For example, a plurality of kinds of vibration having different frequencies, such as an idle vibration and a shake vibration, are input to this vibration damping device. Thus, in this vibration damping device, the respective resonant frequencies of the first limiting passage and the second limiting passage are set (tuned) to the respective frequencies of the different kinds of vibration. As the plunger member moves between the open position and the blocking position according to the frequency of an input vibration, a limiting passage through which a liquid flows is switched between the first limiting passage and the second limiting passage.

CITATION LIST

Patent Literature

[Patent Document 1] Japanese Unexamined Patent Application, First Publication No. 2007-120598

SUMMARY OF INVENTION

Technical Problem

However, in the related-art vibration damping device, there is room for improvement in simplification of structure and facilitation of manufacture.

Additionally, in the related-art vibration damping device, for example, when an unintended vibration, such as a fine vibration having a higher frequency and an extremely smaller amplitude than the resonant frequency of a limiting passage determined depending on a passage length, a cross-sectional area, or the like of the limiting passage, is input, a dynamic spring constant may increase due to clogging of the limiting passage, which may influence the product characteristics of the vibration damping device, such as the driving comfort of automobiles.

The invention has been made in view of the aforementioned circumstances, and an object thereof is to provide a vibration damping device that can achieve simplification of structure and facilitation of manufacture while maintaining product characteristics.

Solution to Problem

In order to solve the above problems, the invention proposes the following means.

A vibration damping device of the invention includes a tubular first attachment member coupled to any one of a vibration generating part and a vibration receiving part, and a second attachment member coupled to the other thereof; an elastic body coupling both of the attachment members; and a partitioning member that partitions a liquid chamber within the first attachment member having a liquid enclosed therein into a first liquid chamber and a second liquid chamber. At least one of the first liquid chamber and the second liquid chamber has the elastic body on a portion of a wall surface thereof. The partitioning member is provided with a vortex chamber unit that communicates with the first liquid chamber and the second liquid chamber. The vortex chamber unit includes a vortex chamber communicating with one liquid chamber through a laminar flow path and communicating with the other liquid chamber through a communication hole, of both the liquid chambers. The laminar flow path is opened into the vortex chamber from inner peripheral surfaces that face in radial directions of the vortex chamber being aimed in circumferential directions of the vortex chamber among wall surfaces defining the vortex chamber. The communication hole is opened into the vortex chamber from an end surface that faces in a direction of center axis of the vortex chamber being aimed in the direction of the center axis among the wall surfaces defining the vortex chamber. Blocking members extending in the direction of the center axis so as to surround the communication hole from an outside in the radial direction are provided within the vortex chamber. The blocking members are provided with flow openings penetrating the blocking members. The vortex chamber form circulating flow of a liquid according to a flow speed of the liquid flowing in from the laminar flow path and allow the liquid to flow out from the coma communication hole through the flow openings.

According to the invention, when the vibration is input and the liquid flows through the vortex chamber unit between both the liquid chambers, the liquid flows from the laminar flow path into the vortex chamber at a sufficiently high speed and circulates within the vortex chamber. Then, for example, vibration can be absorbed and damped by increasing the pressure loss of the liquid due to an energy loss by firming the circulating flow, an energy loss by friction between the liquid and the wall surface of the vortex chamber, or the like. Furthermore, the liquid circulating within the vortex chamber is allowed to pass through the flow opening while regulating flowing out of the liquid from the vortex chamber through the communication hole by the blocking member. It is possible to prevent the liquid circulating within the vortex chamber from reaching the communication holes from a position shifted from the flow openings in the blocking members by shortcutting. It is possible to increase the length of the vortex within the vortex chamber and to reliably increase the pressure loss of the liquid.

Therefore, for example, when normal vibration such as idle vibration and shake vibration is input, it is possible to absorb and damp the vibration according to the flow speed of the liquid regardless of the frequency of the vibration. Therefore, it is possible to achieve simplification of structure and facilitation of manufacture absorbing and damping a plurality of kinds of vibration having different frequencies from each other.

On the other hand, if the flow speed of the liquid is low and circulation of the liquid within the vortex chamber is limited, the liquid smoothly passes through the vortex chamber and an increase in a dynamic spring constant is suppressed. Therefore, for example, when the flow speed of the liquid is lower than that when normal vibration is input such as when unintentional vibration such as fine vibration having higher frequency and extremely smaller amplitude than those of normal vibration is input, it is possible to suppress an increase in the dynamic spring constant and it is possible to easily maintain product characteristics of the vibration damping device.

In addition, the flow opening may be disposed on the same straight line as an opening portion opened to an inner peripheral surface of the vortex chamber in the laminar flow path and the communication hole in a plan view of the partitioning member viewed in the direction of the center axis.

In this case, the flow opening is disposed on the same straight line as an opening portion of the laminar flow path and the communication hole in a plan view viewed in the direction of the center axis. Therefore, when the flow speed of the liquid flowing from the laminar flow path into the vortex chamber is low, the liquid passed through the opening portion of the laminar flow path linearly flows to the communication hole. Therefore, it is possible to reduce the flow path of the liquid and it is possible to easily maintain product characteristics of the vibration damping device.

In addition, the blocking member may extend over an entire length in the direction of the center axis between end surfaces facing in the direction of the center axis in the vortex chamber.

In this case, the blocking member extends over an entire length in the direction of the center axis between end surfaces facing in the direction of the center axis in the vortex chamber. Therefore, for example, it is possible to restrain the liquid circulating within the vortex chamber from reaching the communication hole passing through between an end edge of the blocking member in the direction of the center axis and an end surface of the vortex chamber. It is possible to increase a length of the circulating flow of the liquid formed in the vortex chamber in a circulating direction. In addition, it is possible to reliably increase the pressure loss of the liquid.

In addition, the partitioning member may partition the liquid chamber in an axial direction of the first attachment member. The vortex chambers may be disposed in the partitioning member such that the center axis is parallel to the axis of the first attachment member.

In this case, the vortex chamber is disposed in the partitioning member partitioning the liquid chamber in the axial direction of the first attachment member such that the center axis is parallel to the axis of the first attachment member. Therefore, it is possible to reliably limit the size of the vortex chamber unit in the axial direction of the first attachment member. It is possible to prevent an increase in volume of the partitioning member in the axial direction of the first attachment member.

In addition, the communication hole may be disposed coaxially with the center axis of the vortex chamber.

In this case, the communication hole is disposed coaxially with the center axis of the vortex chamber. Therefore, it is possible to increase the length of the circulating flow of the liquid formed in the vortex chamber in the circulating direction. It is possible to facilitate staying of the liquid within the vortex chamber. It is possible to further effectively increase the pressure loss of the liquid.

In addition, the partitioning member may be provided with a limiting passage which communicates with both the liquid chambers and of which a resonant frequency is equal to a frequency of a first vibration. A resonant frequency of the laminar flow path may be equal to a frequency of a second vibration which is higher than the frequency of the first vibration.

In this case, when inputting the first vibration, a large amount of liquid per unit time flows from the laminar flow path into the vortex chamber, for example, according to the amplitude of the first vibration and the like. In this case, for example, a flow is formed so as to circulate within the vortex chamber by an inertial force of the liquid flowed into the inside thereof. The flow is developed and become a vortex. Therefore, the flow resistance between both the liquid chambers through the vortex chamber unit is increased. Thus, the liquid is preferentially circulated between both the liquid chambers through the limiting passage and resonance is generated within the limiting passage. Therefore, the first vibration is absorbed and damped.

On the other hand, when inputting the second vibration, a small amount of the liquid per unit time flows from the laminar flow path into the vortex chamber, for example, according to the amplitude of the second vibration. Therefore, the vortex within the vortex chamber by the liquid flowed into the inside thereof is not sufficiently developed and the flow resistance between the two liquid chambers through the vortex chamber unit is reduced. Thus, the liquid can actively flow through the vortex chamber unit and the resonance is generated within the laminar flow path. Therefore, the second vibration is absorbed and damped.

In addition, the vortex chamber may include a first vortex chamber communicating with the first liquid chamber through a first communication hole and a second vortex chamber communicating with the second liquid chamber through a second communication hole. The laminar flow path may allow the first vortex chamber and the second vortex chamber to communicate with each other, and may be opened to each vortex chamber in a circumferential direction of each vortex chamber.

In this case, the first communication hole allows the first vortex chamber and the first liquid chamber to communicate with each other and the second communication hole allows the second vortex chamber and the second liquid chamber to communicate with each other. Therefore, for both of the liquid flowing from the first liquid chamber to the second liquid chamber through the vortex chamber unit and the liquid flowing from the second liquid chamber to the first liquid chamber through the vortex chamber unit, the above operational effects are obtained and it is possible to prevent constraints on apparatuses to which the vibration damping device is able to be applied.

In addition, the laminar flow path allows the first vortex chamber and the second vortex chamber to communicate with each other and is opened to each vortex chamber in the circumferential direction of each vortex chamber. Thus, the laminar flow path opened to the first and second vortex chambers is common. Therefore, it is possible to make the vortex chamber unit compact and to limit an increase in the volume of the partitioning member, for example, compared to a structure in which a laminar flow path allowing the first vortex chamber and the second liquid chamber to communicate with each other and a laminar flow path allowing the second vortex chamber and the first liquid chamber to communicate with each other are formed.

Advantageous Effects of Invention

According to the invention, it is possible to achieve simplification of structure and facilitation of manufacture while maintaining product characteristics of the vibration damping device.

DESCRIPTION OF EMBODIMENTS

Hereinafter, an embodiment of a vibration damping device according to the invention will be described with reference to FIGS. 1 to 5.

Figure 1:
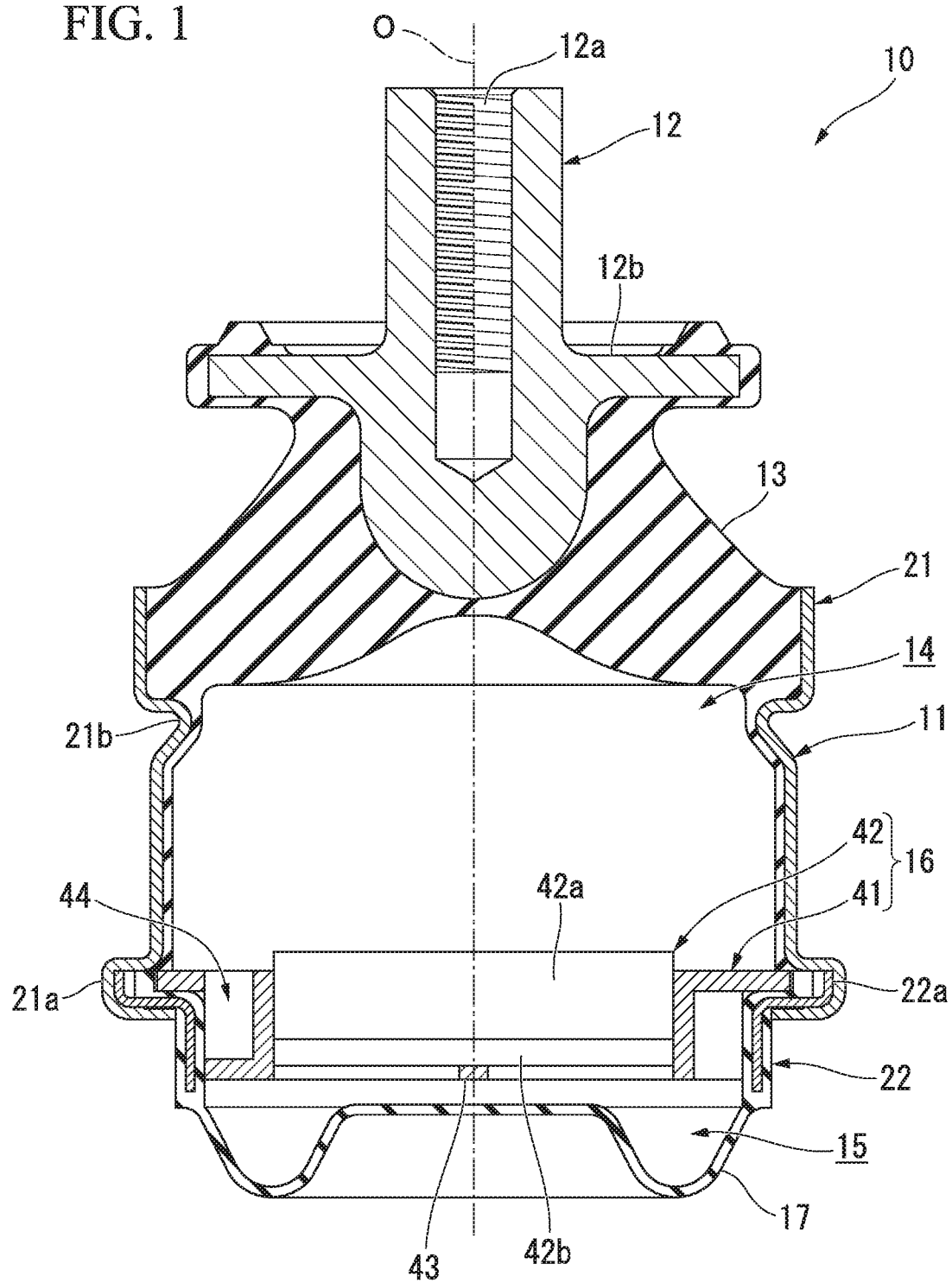
FIG. 1 is a longitudinal sectional view of an entire vibration damping device showing an embodiment of the invention except for a vortex chamber member of a partitioning member.

As shown in FIG. 1, a vibration damping device 10 includes a tubular first attachment member 11 coupled to any one of a vibration generating part and a vibration receiving part, and a second attachment member 12 coupled to the other thereof; an elastic body 13 coupling both the attachment members 11 and 12; and a partitioning member 16 that partitions a liquid chamber within the first attachment member 11 having a liquid enclosed therein into a main liquid chamber (first liquid chamber) 14 having the elastic body 13 in a part of a wall surface and an auxiliary liquid chamber (second liquid chamber) 15.

In the shown example, the second attachment member 12 is formed in a pillar shape, and the elastic body 13 is formed in a tubular shape. The first attachment member 11, the second attachment member 12, and the elastic body 13 are disposed coaxially with a common axis. Hereinafter, this common axis is referred to as a main axis O (axis of the first attachment member), a main liquid chamber 14 side in a direction (axial direction of the first attachment member or a direction of a center axis) of the main axis O is referred to as the first side, an auxiliary liquid chamber 15 side is referred to as the second side, a direction orthogonal to the main axis O is referred to as a radial direction.

In a case where the vibration damping device 10 is mounted on, for example, an automobile, the second attachment member 12 is coupled to an engine serving as the vibration generating part. Meanwhile, the first attachment member 11 is coupled to a vehicle body serving as the vibration receiving part via a bracket (not shown), and prevents the vibration of the engine from being transmitted to the vehicle body. The vibration damping device 10 is of a liquid-enclosed type in which, for example, the liquid, such as ethylene glycol, water, or silicone oil, is enclosed in a liquid chamber of the first attachment member 11.

The first attachment member 11 includes a first-side outer tube body 21 located on a first side in the direction of the main axis O, and a second-side outer tube body 22 located on a second side in the direction of the main axis O.

The elastic body 13 is coupled to a first-side end of the first-side outer tube body 21 in a liquid-tight state. A first side opening of the first-side outer tube body 21 is blocked by the elastic body 13. The second-side end 21a of the first-side outer tube body 21 is formed with a larger diameter than the other portions. The inside of the first-side outer tube body 21 serves as the main liquid chamber 14. The liquid pressure of the main liquid chamber 14 fluctuates when the elastic body 13 is deformed and the internal volume of the main liquid chamber 14 varies, at the time of the input of vibration.

In addition, an annular groove 21b that extends continuously over a whole circumference is formed in a portion of the first-side outer tube body 21 that is connected to a portion, to which the elastic body 13 is coupled, from the second side.

A diaphragm 17 is coupled to the second-side end of the second-side outer tube body 22 in a liquid-tight state, and the second-side opening of the second-side outer tube body 22 is blocked by the diaphragm 17. A first-side end 22a of the second-side outer tube body 22 is formed with a larger diameter than the other portions, and is fitted into a second-side end 21a of the first-side outer tube body 21. Additionally, the partitioning member 16 is fitted into the second-side outer tube body 22, and a portion of the inside of the second-side outer tube body 22 between the partitioning member 16 and the diaphragm 17 serves as the auxiliary liquid chamber 15. The auxiliary liquid chamber 15 has the diaphragm 17 as a portion of a wall surface thereof, and is expanded and contracted when the diaphragm 17 is deformed. In addition, the second-side outer tube body 22 is covered substantially over the entire region with a rubber membrane formed integrally with the diaphragm 17.

A female thread part 12a is formed coaxially with the main axis O in a first-side end surface of the second attachment member 12. The second attachment member 12 protrudes from the first attachment member 11 to the first side.

A flange part 12b that protrudes toward a radial outer side and continuously extends over a whole circumference is formed in the second attachment member 12. The flange part 12b is separated from a first-side end edge of the first attachment member 11 to the first side.

The elastic body 13 is formed of, for example, a rubber material or the like capable of being elastically deformed, and is formed in a tubular shape that has a gradually enlarged diameter from the first side toward the second side. A first-side end of the elastic body 13 is coupled to the second attachment member 12 and the second-side end thereof is coupled to the first attachment member 11.

In addition, an inner peripheral surface of the first-side outer tube body 21 of the first attachment member 11 is covered substantially over the entire region with the rubber membrane formed integrally with the elastic body 13.

The partitioning member 16 partitions the vortex chamber in the direction of the main axis O. The partitioning member 16 is provided with a mounting member 41 and a vortex chamber member 42. The mounting member 41 is mounted on the first attachment member 11. The mounting member 41 is formed annularly and coaxially with the main axis O, and is fitted into the second-side outer tube body 22. A support member 43 is provided in the second-side end of the mounting member 41. The support member 43 is formed in a cross shape in a plan view of the vibration damping device 10 viewed in the direction of the main axis O. The vortex chamber member 42 is fitted into the mounting member 41 in an air tight manner. The support member 43 supports the second-side end surface of the vortex chamber member 42.

Here, the partitioning member 16 is provided with a vortex chamber unit 31 and a limiting passage 44 and the vortex chamber unit 31 allows both liquid chambers 14 and 15 to communicate with each other.

Figure 2:
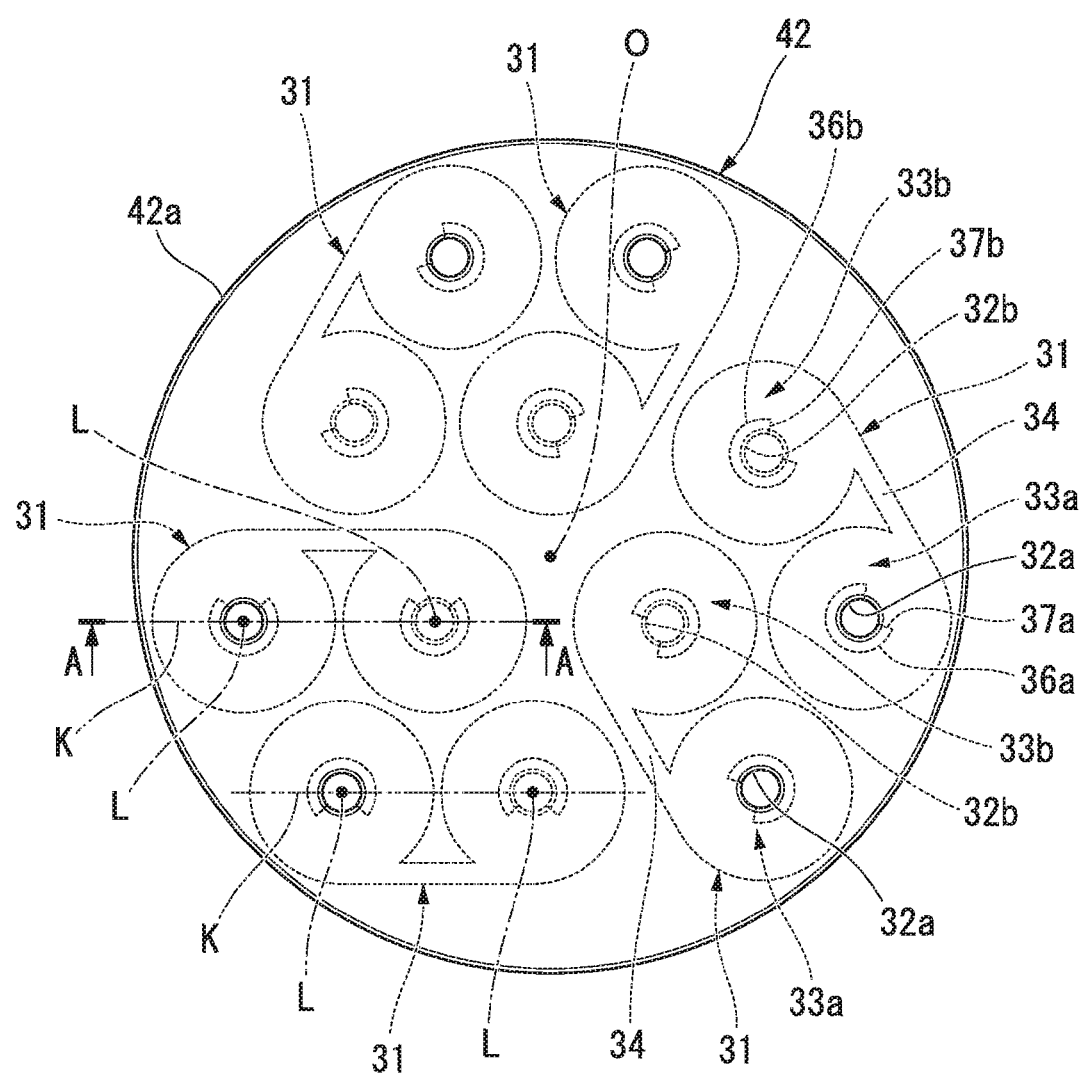
FIG. 2 is a plan view of the vortex chamber member of the vibration damping device shown in FIG. 1.
Figure 3:
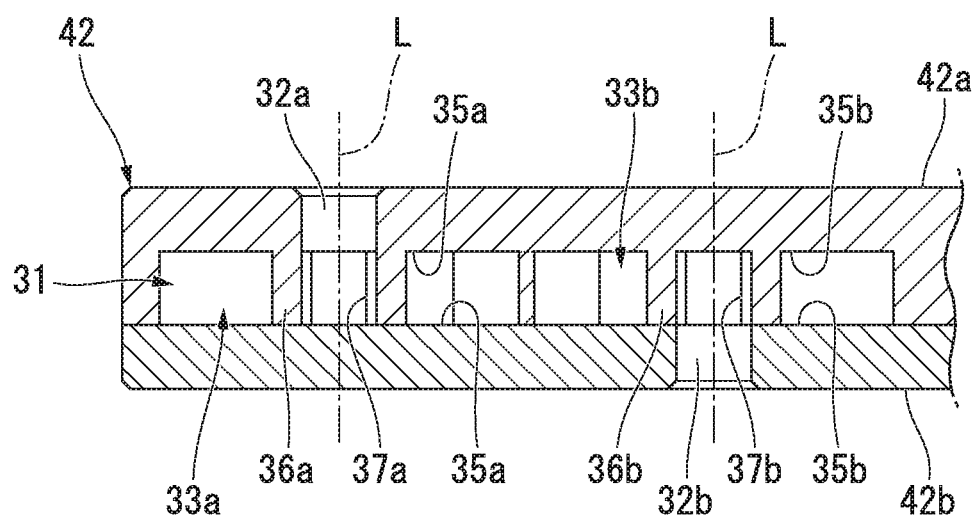
FIG. 3 is a sectional view that is taken along line A-A of FIG. 2.

The vortex chamber unit 31 is formed in the vortex chamber member 42. The vortex chamber unit 31 includes, as shown in FIGS. 2 and 3, a first communication hole 32a opened to the main liquid chamber 14, a second communication hole 32b opened to the auxiliary liquid chamber 15, a first vortex chamber 33a communicating with the main liquid chamber 14 through the first communication hole 32a, a second vortex chamber 33b communicating with the auxiliary liquid chamber 15 through the second communication hole 32b, and a laminar flow path 34 allowing the first vortex chamber 33a and the second vortex chamber 33b to communicate with each other.

The first and second vortex chambers 33a and 33b are disk-like spaces having a circular shape in a plan view viewed in the direction of the main axis O.

The first and second vortex chambers 33a and 33b are formed with the same shape and the same size as each other. The first and second vortex chambers 33a and 33b are disposed in parallel such that respective center axes L are parallel to each other. The respective center axes L are parallel to the main axis O. The first and second vortex chambers 33a and 33b are disposed on a same plane orthogonal to the main axis O.

Figure 4:
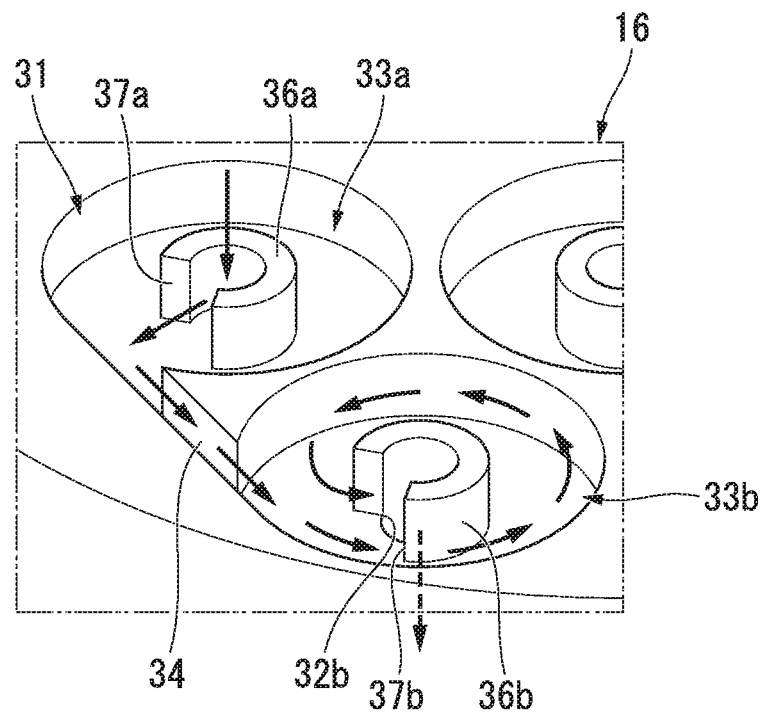
FIG. 4 is a schematic view of a main portion of a vortex chamber unit shown in FIGS. 2 and 3, and is a view describing a flow of a liquid in a case where a flow speed of the liquid flowing from a laminar flow path into a vortex chamber is high.
Figure 5:
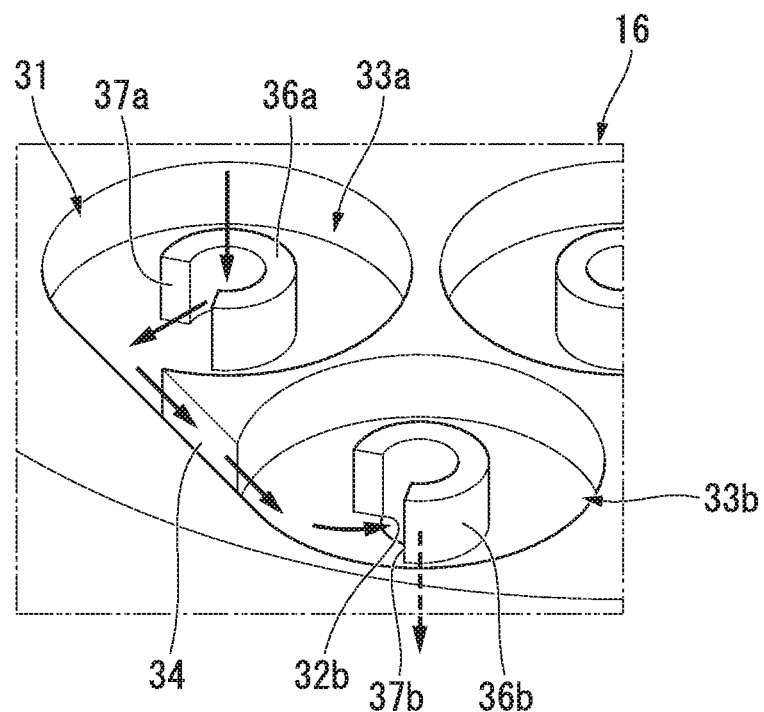
FIG. 5 is a schematic view of the main portion of the vortex chamber unit shown in FIGS. 2 and 3, and is a view showing a flow of the liquid in a case where the flow speed of the liquid flowing from the laminar flow path into the vortex chamber is low.

Then, as shown in FIG. 4, the first and second vortex chambers 33a and 33b are formed to rotate the liquid flowed from the laminar flow path 34 into the inside around the center axis L. In addition, the first and second vortex chambers 33a and 33b are formed to cause the liquid flowed from the first and second communication holes 32a and 32b into the inside to pass through the laminar flow path 34 without rotating.

Here, each of the first and second vortex chambers 33a and 33b is a disk-like space that is defined by two end surfaces 35a and 35b in the center axis L, and a peripheral surface connecting outer peripheral edges of the two end surfaces 35a and 35b.

Then, the first and second communication holes 32a and 32b are opened to one of the end surfaces 35a and 35b of the two end surfaces 35a and 35b defining the first and second vortex chambers 33a and 33b. In the shown example, the first and second communication holes 32a and 32b are disposed coaxially with the center axis L.

The laminar flow path 34 is opened to the first and second vortex chambers 33a and 33b in a circumferential direction around the center axis L of each of the vortex chambers 33a and 33b. In the shown example, the laminar flow path 34 extends straight. As shown in FIG. 2, the laminar flow path 34 extends straight so as to circumscribe the first and second vortex chambers 33a and 33b that have the circular shape in a plan view viewed in the direction of the main axis O. Moreover, the laminar flow path 34 extends in a tangential direction so as to circumference the first and second vortex chambers 33a and 33b in a plan view viewed in the direction of the main axis O. The laminar flow path 34 is parallel to a virtual line K connecting the center axes L of the first and second vortex chambers 33a and 33b in a plan view viewed in the direction of the main axis O.

Here, blocking members 36a and 36b, which extend in the direction of the main axis O so as to surround the communication holes 32a and 32b from an outside in a radial direction of the vortex chamber that is the radial direction of the vortex chambers 33a and 33b, are provided within the vortex chambers 33a and 33b. For the blocking members 36a and 36b, a first blocking member 36a provided within the first vortex chamber 33a and a second blocking member 36b provided within the second vortex chamber 33b are provided.

The first and second blocking members 36a and 36b extend over an entire length between the end surfaces 35a and 35b facing each other within the first and second vortex chambers 33a and 33b in the direction of the main axis O.

The first and second blocking members 36a and 36b are provided integrally with one of the end surfaces 35a and 35b among the end surfaces 35a and 35b of the first and second vortex chambers 33a and 33b, and are in close contact with the second side of the end surfaces 35a and 35b.

The first and second blocking members 36a and 36b are formed in a tubular shape, or a cylindrical shape in the shown example extending in the direction of the main axis O, and are disposed coaxially with the first and second communication holes 32a and 32b. The first and second blocking members 36a and 36b respectively partition the first and second vortex chambers 33a and 33b into a space which is positioned on an inside of the blocking members 36a and 36b in the radial direction of the vortex chamber and a space which is positioned on an outside thereof in the radial direction of the vortex chamber. An inner diameter of the first and second blocking members 36a and 36b is equal to a diameter of the first and second communication holes 32a and 32b, and the first and second blocking members 36a and 36b are disposed in opening peripheral edges of the first and second communication holes 32a and 32b in the end surfaces 35a and 35b of the first and second vortex chambers 33a and 33b.

The first and second blocking members 36a and 36b are provided with flow openings 37a and 37b penetrating the blocking members 36a and 36b. In the shown example, the flow openings 37a and 37b are provided in the blocking members 36a and 36b one by one, and penetrate straightly the blocking members 36a and 36b in the radial direction of the vortex chamber. The flow openings 37a and 37b allow the space positioned on the inside of the blocking members 36a and 36b in the radial direction of the vortex chamber and the space positioned on the outside thereof in the radial direction of the vortex chamber to communicate with each other. For the flow openings 37a and 37b, a first flow opening 37a that is provided within the first blocking member 36a and a second flow opening 37b that is provided within the second blocking member 36b are provided.

The first and second flow openings 37a and 37b are disposed on the same straight line as an opening in the laminar flow path 34 opened to the inner peripheral surface of the first and second vortex chambers 33a and 33b, and the first and second communication holes 32a and 32b in a plan view of the partitioning member 16 viewed in the direction of the main axis O. The first and second flow openings 37a and 37b are opened in a direction orthogonal to the virtual line K in a plan view viewed in the direction of the main axis O. The first and second flow openings 37a and 37b are formed in a rectangular shape extending in the direction of the main axis O in a front view viewed in an opening direction thereof. The first and second flow openings 37a and 37b are formed over an entire length in the direction of the main axis O in the first and second blocking members 36a and 36b.

Six vortex chamber units 31 having such a configuration are formed in the partitioning member 16.

Respective vortex chamber units 31 are disposed in different positions on the same plane orthogonal to the main axis O.

In the shown example, three sets of one set of two vortex chamber units 31 and 31 are formed in the partitioning member 16.

One set of vortex chamber units 31 and 31 are disposed in such a manner that peripheral surface portions of the first and second vortex chambers 33a and 33b opposite to the laminar flow path 34 in each vortex chamber unit 31 face each other, and the laminar flow paths 34 in the vortex chamber units 31 are parallel to each other. The vortex chamber units 31 are disposed in the partitioning member 16 in such a manner that positions in extending directions of the laminar flow paths 34 are offset from each other. A plurality of vortex chamber units 31 are disposed as described above and thereby it is possible to further improve space efficiency.

Here, the limiting passage 44 is provided independently of the vortex chamber unit 31 and as shown in FIG. 1, is formed on an outer peripheral surface of the mounting member 41. A resonant frequency of the limiting passage 44 is equal to a frequency of shake vibration (first vibration) (for example, the frequency is equal to or less than 14 Hz and an amplitude is greater than ±0.5 mm) and generates a resonance (liquid column resonance) with respect to an input of shake vibration.

The resonant frequency of the limiting passage 44 is lower than a resonant frequency of the laminar flow path 34. The resonant frequency of the laminar flow path 34 is equal to a frequency of idle vibration (second vibration) (for example, the frequency is 14 Hz to 40 Hz, and the amplitude is equal to or less than ±0.5 mm) of which the frequency is higher and the amplitude is lower than those of shake vibration. The laminar flow path 34 functions as an orifice for generating the resonance (liquid column resonance) with respect to the input of idle vibration.

The vortex chamber member 42 is divided into two divided bodies 42a and 42b in the direction of the main axis O.

In the shown example, the vortex chamber member 42 is divided at the second-side end in the direction of the main axis O.

The first and second vortex chambers 33a and 33b, a recessed part defining the laminar flow path 34, the first communication hole 32a, and the blocking members 36a and 36b are formed in a divided body 42a positioned on the first side in the direction of the main axis O. A divided body 42b positioned on the second side in the direction of the main axis O defines the first and second vortex chambers 33a and 33b, and the laminar flow path 34 by covering the recessed part defining the laminar flow path 34, and has the second communication hole 32b.

Next, an operation of the vibration damping device 10 will be described.

In the vibration damping device 10, the vortex chamber unit 31 is designed such that shake vibration is absorbed and damped by each of the plurality of vortex chamber units 31 when shake vibration is input.

That is, when shake vibration is input into the vibration damping device 10 in the direction of the main axis O, both the attachment members 11 and 12 are relatively displaced while elastically deforming the elastic body 13 and thereby the liquid pressure of the main liquid chamber 14 fluctuates.

Then, a large amount of the liquid per unit time within the main liquid chamber 14 or the auxiliary liquid chamber 15 flows into the second vortex chamber 33b through the first communication hole 32a, the first vortex chamber 33a, and the laminar flow path 34, or flows into the first vortex chamber 33a through the second communication hole 32b, the second vortex chamber 33b, and the laminar flow path 34 according to the amplitude of shake vibration. That is, as indicated by arrows in FIG. 4, when inputting shake vibration, the liquid having a high flow speed flows into the second vortex chamber 33b through the laminar flow path 34, or flows into the first vortex chamber 33a. Thus, for example, flows are formed so as to circulate the inside of the second vortex chamber 33b or the inside of the first vortex chamber 33a around the center axis L by the inertial force of the liquid flowed into the inside and the flows developed to a vortex. Furthermore, flow-out of the vortex from the vortex chambers 33a and 33b through the communication holes 32a and 32b is allowed through the first and second flow openings 37a and 37b while regulating by the blocking members 36a and 36b. It is possible to prevent the vortex from reaching the communication holes 32a and 32b from a position shifted from the flow openings 37a and 37b in the blocking members 36a and 36b by shortcutting. It is possible to increase the length of the vortex within the vortex chambers 33a and 33b.

Therefore, the flow resistance between the main liquid chamber 14 and the auxiliary liquid chamber 15 through the vortex chamber unit 31 is increased. Thus, the liquid preferentially flows between the main liquid chamber 14 and the auxiliary liquid chamber 15 through the limiting passage 44, the liquid column mice is generated within the limiting passage 44, and thereby shake vibration is absorbed and damped.

On the other hand, when idle vibration is input into the vibration damping device 10 in the direction of the main axis O and the liquid pressure of the main liquid chamber 14 is fluctuated, the liquid flowing into the second vortex chamber 33b or the first vortex chamber 33a through the laminar flow path 34 is a small amount according to the amplitude of idle vibration. Thus, the vortex is not sufficiently developed within the second vortex chamber 33b or within the first vortex chamber 33a, and as indicated by arrows in FIG. 5, the liquid flowing within the first and second vortex chambers 33a and 33b passes therethrough without circulating or with a small circulating amount. Therefore, the flow resistance between the main liquid chamber 14 and the auxiliary liquid chamber 15 through the vortex chamber unit 31 is reduced. Moreover, in this case, the liquid passed through the opening of the laminar flow path 34 flows straightly toward the communication holes 32a and 32b and thereby the flow path of the liquid can be shortened.

Therefore, the liquid can be actively flow through the vortex chamber unit 31, the resonance is generated within the laminar flow path 34, and thereby idle vibration can be absorbed and damped.

As described above, according to the vibration damping device 10 of the embodiment, it is possible to absorb and damp both shake vibration and idle vibration having different frequencies from each other and to achieve simplification of structure and facilitation of manufacture of the vibration damping device 10 by providing the vortex chamber unit 31 in place of a plunger member as in the related art.

In addition, the first communication hole 32*a* allows the first vortex chamber 33*a* and the main liquid chamber 14 to communicate with each other and the second communication hole 32*b* allows the second vortex chamber 33*b* and the auxiliary liquid chamber 15 to communicate with each other. Therefore, for both the liquid flowing from the main liquid chamber 14 to the auxiliary liquid chamber 15 through the vortex chamber unit 31 and the liquid flowing from the auxiliary liquid chamber 15 to the main liquid chamber 14 through the vortex chamber unit 31, it is possible to obtain the operational effects described above and to prevent occurrence of constraints on the apparatuses to which the vibration damping device 10 is able to applied.

In addition, the laminar flow path 34 allows the first vortex chamber 33*a* and the second vortex chamber 33*b* to communicate with each other and is opened to each of the vortex chambers 33*a* and 33*b* in the circumferential direction of each of the vortex chambers 33*a* and 33*b* and the laminar flow path 34 opened to the first and second vortex chambers 33*a* and 33*b* is common. Therefore, it is possible to make the vortex chamber unit 31 compact and to reduce an increase in the volume of the partitioning member 16, for example, compared to a structure in which a laminar flow path allowing the first vortex chamber 33*a* and the auxiliary liquid chamber 15 to communicate with each other and a laminar flow path allowing the second vortex chamber 33*b* and the main liquid chamber 14 to communicate with each other are formed.

In addition, the blocking members 36*a* and 36*b* extend over an entire length between the end surfaces 35*a* and 35*b* facing each other in the direction of the main axis O in the vortex chambers 33*a* and 33*b* in the direction of the main axis O. Therefore, for example, the liquid within the vortex chambers 33*a* and 33*b* can be prevented from reaching the communication holes 32*a* and 32*b* which pass through end edges of the blocking members 36*a* and 36*b* in the direction of the main axis O, and the end surfaces 35*a* and 35*b* of the vortex chambers 33*a* and 33*b*. It is possible to increase the length of the vortex formed in the vortex chambers 33*a* and 33*b*.

In addition, the first and second vortex chambers 33*a* and 33*b* are disposed in the partitioning member 16 partitioning the liquid chamber within the first attachment member 11 in the direction of the main axis O such that each center axis L is parallel to the main axis O. Therefore, it is possible to reliably limit the size of the vortex chamber unit 31 in the direction of the main axis O and to prevent an increase in the volume of the partitioning member 16 in the direction of the main axis O.

In addition, the first and second communication holes 32*a* and 32*b* are opened from the end surfaces 35*a* and 35*b* of the first and second vortex chambers 33*a* and 33*b* into the first and second vortex chambers 33*a* and 33*b*. Therefore, it is possible to stably generate the circulation flow of the liquid within the first and second vortex chambers 33*a* and 33*b* and to effectively increase the pressure loss of the liquid.

In addition, the first and second communication holes 32*a* and 32*b* are disposed coaxially with each center axis L of the first and second vortex chambers 33*a* and 33*b*. Therefore, it is possible to increase the length of the circulation flow of the liquid formed in the first and second vortex chambers 33*a* and 33*b* in the circulating direction and to allow the liquid to stay within the first and second vortex chambers 33*a* and 33*b*. It is possible to further effectively increase the pressure loss of the liquid.

In addition, the technical scope of the invention is not limited to the embodiment and various changes can be made without departing from the scope of the invention.

For example, in the embodiment, the limiting passage 44 is formed in the partitioning member 16, but the limiting passage 44 may not be formed.

In the vibration damping device, the main liquid chamber 14 and the auxiliary liquid chamber 15 communicate with each other only through the vortex chamber unit 31. Then, the vortex chamber unit 31 is designed such that vibration is absorbed and damped by each of the plurality of vortex chamber units 31 when normal vibration such as shake vibration and idle vibration is input.

That is, in idle vibration, the amplitude is relatively small and the frequency is high, and in shake vibration, the frequency is low and the amplitude is large. Therefore, when normal vibration is input, it is possible to increase both the flow speed of the liquid flowing from the main liquid chamber 14 into the second vortex chamber 33*b* through the first communication hole 32*a*, the first vortex chamber 33*a*, and the laminar flow path 34, and the flow speed of the liquid flowing from the auxiliary liquid chamber 15 into the first vortex chamber 33*a* through the second communication hole 32*b*, the second vortex chamber 33*b*, and the laminar flow path 34 to a certain level or more.

Therefore, a shape of the vortex chamber unit 31 of the modification example is different from the vortex chamber unit 31 of the vibration damping device 10 according to the embodiment. Thus, even when any vibration of shake vibration and idle vibration is input, as shown by arrows in FIG. 4, it is possible to circulate the liquid from the laminar flow path 34 around the center axis L within any one of the vortex chambers 33*a* and 33*b* among the first vortex chamber 33*a* and the second vortex chamber 33*b*.

As a result, vibration can be absorbed and damped by increasing the pressure loss of the liquid due to an energy the lower-side surface, for example, by viscous resistance, the energy loss by forming the circulation flow, the energy loss by friction between the liquid and the wall surface of one of the vortex chambers 33*a* and 33*b*, or the like. Furthermore, flow-out of the liquid circulating within one of the vortex chambers 33*a* and 33*b* from one of the vortex chambers 33*a* and 33*b* through the communication holes 32*a* and 32*b* is allowed through the first and second flow openings 37*a* and 37*b* while being regulated by the blocking members 36*a* and 36*b*. It is possible to prevent the liquid circulating within one of the vortex chambers 33*a* and 33*b* from reaching the communication holes 32*a* and 32*b* from a position shifted from the flow openings 37*a* and 37*b* in the blocking members 36*a* and 36*b* by shortcutting. It is possible to increase the length of the circulation flow within one of the vortex chambers 33*a* and 33*b*, and to reliably increase the pressure loss of the liquid.

Here, the flow rate of the liquid flowing from the laminar flow path 34 into each of the vortex chambers 33*a* and 33*b* is increased along with the increase of the flow speed of the liquid. Therefore, the inside of one of the vortex chambers 33*a* and 33*b* is filled with the circulation flow of the liquid and the liquid flows into one of the vortex chambers 33a and 33b, it is possible to increase the pressure loss of the liquid.

Then, thereafter, the liquid circulated within the first vortex chamber 33a flows out from the first communication hole 32a and flows into the main liquid chamber 14. In addition, the liquid circulated within the second vortex chamber 33b flows out from the second communication hole 32b and flows into the auxiliary liquid chamber 15.

However, in the vibration damping device, for example, fine vibration of which the frequency is higher and the amplitude is extremely smaller than expected, or the like may be unintentionally input. Such fine vibration is input, the flow speed of the liquid flowing into one of the vortex chambers 33a and 33b through the laminar flow path 34 is low. Therefore, for example, as indicated by arrows in FIG. 5, the circulation of the liquid within one of the vortex chambers 33a and 33b is suppressed. Then, in a case where the circulation flow of the liquid is not generated within one of the vortex chambers 33a and 33b, the liquid simply passes through one of the vortex chambers 33a and 33b. Therefore, an increase in the dynamic spring constant is suppressed. Moreover, in this case, the liquid passed through the opening of the laminar flow path 34 linearly flows to the communication holes 32a and 32b and thereby it is possible to decrease the flow path of the liquid.

As described above, according to the vibration damping device of the modification example, it is possible to increase the pressure loss of the liquid and to absorb and damp vibration by forming the circulation flow of the liquid within one of the vortex chambers 33a and 33b. Therefore, for example, when normal vibration such as idle vibration and shake vibration is input, it is possible to absorb and damp vibration according to the flow speed of the liquid regardless of the frequency of the vibration. Therefore, it is possible to achieve simplification of structure and facilitation of manufacture while absorbing and damping plurality of kinds of vibration having different frequencies from each other.

In addition, in a state where the circulation of the liquid within one of the vortex chambers 33a and 33b is limited, an increase in the dynamic spring constant is suppressed. Therefore, for example, when the flow speed of the liquid is lower than that when normal vibration is input such as when unintentional vibration such as fine vibration having higher frequency and extremely smaller amplitude than those of normal vibration, it is possible to suppress an increase in the dynamic spring constant and it is possible to easily maintain product characteristics of the vibration damping device.

In addition, the blocking members 36a and 36b extend over the entire length in the direction of the center axis O between the end surfaces facing in the direction of the center axis O in one of the vortex chambers 33a and 33b. Therefore, for example, it is possible to prevent the liquid circulating within one of the vortex chambers 33a and 33b from reaching the communication holes 32a and 32b which pass through end edges of the blocking members 36a and 36b in the direction of the center axis O and the end surfaces of one of the vortex chambers 33a and 33b. It is possible to increase the length of the circulating flow of the liquid formed in one of the vortex chambers 33a and 33b in the circulating direction. In addition, it is possible to reliably increase the pressure loss of the liquid.

Here, in each embodiment, both idle vibration and shake vibration are absorbed and damped, but the invention is not limited to each embodiment. The invention may be appropriately changed to another structure in which both kinds of vibration of a first vibration and a second vibration of which the frequency is higher than that of the first vibration are absorbed and damped.

In addition, in the embodiment, The flow openings 37a and 37b are disposed on the same straight line as the opening in the laminar flow path 34 and the communication holes 32a and 32b in a plan view viewed in the direction of the main axis O, but may not be disposed on the same straight line.

In addition, in the embodiment, the flow openings 37a and 37b are provided in the blocking members 36a and 36b one by one, but the invention is not limited to the embodiment. For example, a plurality of flow openings may be formed in each blocking member.

In addition, in the embodiment, the first and second blocking members 36a and 36b are formed in the cylindrical shape in the direction of the main axis O, but may be formed in an angular cylindrical shape.

In addition, in the embodiment, the inner diameter of the first and second blocking members 36a and 36b is equal to the diameter of the first and second communication holes 32a and 32b, and the first and second blocking members 36a and 36b are disposed along the openings of the first and second communication holes 32a and 32b in the end surfaces 35a and 35b of the first and second vortex chambers 33a and 33b, but the invention is not limited to the embodiment. For example, the blocking member is formed to have a diameter greater than the communication hole and the blocking member may be disposed to be separated from the opening of the communication hole in the end surface of the vortex chamber in the radial direction.

In addition, in the embodiment, the flow openings 37a and 37b penetrate straightly the blocking members 36a and 36b in the radial direction of the vortex chamber, but the invention is not limited to the embodiment. For example, the flow opening may be formed in a spiral shape toward a first side of the vortex chamber in the circumferential direction while facing outside the vortex in the radial direction in a plan view viewed in the direction of the main axis O.

In addition, in the embodiment, the first and second blocking members 36a and 36b are formed in the cylindrical shape extending in the direction of the main axis O, but the invention is not limited to the embodiment. For example, the blocking member has a plurality of blocking pieces disposed with intervals in the circumferential direction of the vortex chamber and the flow opening may be formed between adjacent blocking pieces in the circumferential direction.

In addition, in the embodiment, the center axes L of the first and second vortex chambers 33a and 33b extend parallel to the main axis O, but may extend in a direction crossing the main axis O and the center axes L of the first and second vortex chambers 33a and 33b may extend in a direction crossing each other.

In addition, in the embodiment, the laminar flow path 34 extends parallel to the virtual line K in a plan view viewed in the direction of the main axis O, but, for example, may extend in a direction crossing the virtual line K.

In addition, in the embodiment, a structure in which the vortex chamber member 42 is divided in the second-side end in the direction of the main axis O is shown, but the position dividing the vortex chamber member 42 in the direction of the main axis O may be appropriately changed. In addition, the vortex chamber member 42 may be divided into three or more in the direction of the main axis O, and the entire vortex chamber member 42 may be integrally formed.

In addition, in the embodiment, the first and second vortex chambers 33a and 33b are provided, the invention may be appropriately changed to another form including at least one of the first and second vortex chambers.

In addition, in the embodiment, the first liquid chamber is the main liquid chamber 14 and the second liquid chamber is the auxiliary liquid chamber 15, but the invention is not limited to the embodiment. For example, the first liquid chamber may be appropriately changed to the auxiliary liquid chamber and the second liquid chamber may be changed to the main liquid chamber.

In addition, in the embodiment, the partitioning member 16 partitions the liquid chamber within the first attachment member 11 to the main liquid chamber 14 having a part of the wall surface of the elastic body 13 and the auxiliary liquid chamber 15, but the invention is not limited to the embodiment. For example, a pair of elastic bodies is provided in the direction of the main axis and a pressure receiving liquid chamber having the elastic bodies in a part of the wall surface may be provided instead of providing the auxiliary liquid chamber.

That is, the partitioning member partitions the liquid chamber within the first attachment member to the first liquid chamber and the second liquid chamber and at least one of both the liquid chambers of the first liquid chamber and the second liquid chamber may be appropriately changed to another structure having the elastic bodies in a part of the wall surface.

In addition, the liquid chamber may be partitioned by the partitioning member 16 in a direction crossing the main axis O.

In addition, in the embodiment, the laminar flow path 34 straightly extends in a plan view viewed in the direction of the main axis O, but the invention is not limited to the embodiment. For example, the laminar flow path 34 may be appropriately changed to be curved or to be bent.

In addition, in the embodiment, a case where the engine is coupled to the second attachment member 12 and the first attachment member 11 is coupled to the vehicle body is described, but a structure in which the first attachment member 11 is coupled to the engine and the second attachment member 12 is coupled to the vehicle body, may be provided.

In addition, in the embodiment, an engine mount of the vehicle is shown, but the invention can be also applied to other than the engine mount. For example, the invention can be also applied to a mount of a generator mounted on a construction machine or can be also applied to a mount of a machine installed in a factory or the like.

In addition, the constituent elements in the embodiment can be substituted with well-known constituent elements without departing from the scope of the invention. Additionally, the above-described modifications may be appropriately combined.

INDUSTRIAL APPLICABILITY

According to the invention, it is possible to achieve simplification of structure and facilitation of manufacture while maintaining the product characteristics of the vibration damping device.

REFERENCE SIGNS LIST

10: VIBRATION DAMPING DEVICE
11: FIRST ATTACHMENT MEMBER
12: SECOND ATTACHMENT MEMBER
13: ELASTIC BODY
14: MAIN LIQUID CHAMBER (FIRST LIQUID CHAMBER)
15: AUXILIARY LIQUID CHAMBER (SECOND LIQUID CHAMBER)
16: PARTITIONING MEMBER
31: VORTEX CHAMBER UNIT
32a: FIRST COMMUNICATION HOLE
32b: SECOND COMMUNICATION HOLE
33a: FIRST VORTEX CHAMBER
33b: SECOND VORTEX CHAMBER
34: LAMINAR FLOW PATH
35a, 35b: END SURFACE
36a, 36b: BLOCKING MEMBER
37a, 37b: FLOW OPENING
44: LIMITING PASSAGE
L: CENTER AXIS

The invention claimed is:

1. A vibration damping device comprising:
a tubular first attachment member coupled to any one of a vibration generating part and a vibration receiving part, and a second attachment member coupled to the other thereof;
an elastic body coupling both of the attachment members; and
a partitioning member that partitions a liquid chamber within the first attachment member having a liquid enclosed therein into a first liquid chamber and a second liquid chamber,
wherein at least one of the first liquid chamber and the second liquid chamber has the elastic body on a portion of a wall surface thereof,
wherein the partitioning member is provided with a vortex chamber unit that communicates with the first liquid chamber and the second liquid chamber,
wherein the vortex chamber unit includes a vortex chamber communicating with one liquid chamber through a laminar flow path and communicating with the other liquid chamber through a communication hole, of both the liquid chambers,
wherein the laminar flow path is opened into the vortex chamber from inner peripheral surfaces that face in radial directions of the vortex chamber being aimed in circumferential directions of the vortex chamber among wall surfaces defining the vortex chamber,
wherein the communication hole is opened into the vortex chamber from an end surface that faces in a direction of center axis of the vortex chamber being aimed in the direction of the center axis among the wall surfaces defining the vortex chamber,
wherein blocking members extending in the direction of the center axis so as to surround the communication hole from an outside in the radial direction are provided within the vortex chamber,
wherein the blocking members are provided with flow openings penetrating the blocking members, and
wherein the vortex chamber form circulating flows of a liquid according to a flow speed of the liquid flowing in from the laminar flow path and allows the liquid to flow out from the communication hole through the flow openings.

2. The vibration damping device according to claim 1,
wherein the flow opening is disposed on the same straight line as an opening portion opened to an inner peripheral surface of the vortex chamber in the laminar flow path and the communication hole in a plan view of the partitioning member viewed in the direction of the center axis.

3. The vibration damping device according to claim 1,
wherein the blocking member extends over an entire length in the direction of the center axis between end surfaces facing in the direction of the center axis in the vortex chamber.

4. The vibration damping device according to claim 1,
wherein the partitioning member partitions the liquid chamber in an axial direction of the first attachment member, and
wherein the vortex chamber is disposed in the partitioning member such that the center axis is parallel to the axis of the first attachment member.

5. The vibration damping device according to claim 1,
wherein the communication hole is disposed coaxially with the center axis of the vortex chamber.

6. The vibration damping device according to claim 1,
wherein the partitioning member is provided with a limiting passage which communicates with both the liquid chambers and of which a resonant frequency is equal to a frequency of a first vibration, and
wherein a resonant frequency of the laminar flow path is equal to a frequency of a second vibration which is higher than the frequency of the first vibration.

7. The vibration damping device according to claim 1,
wherein the vortex chamber includes a first vortex chamber communicating with the first liquid chamber through a first communication hole and a second vortex chamber communicating with the second liquid chamber through a second communication hole and
wherein the laminar flow path allows the first vortex chamber and the second vortex chamber to communicate with each other, and is opened to each vortex chamber in a circumferential direction of each vortex chamber.

* * * * *